May 28, 1940.  P. KOLLSMAN  2,202,154
APERIODIC COMPASS
Filed May 25, 1936   2 Sheets-Sheet 1
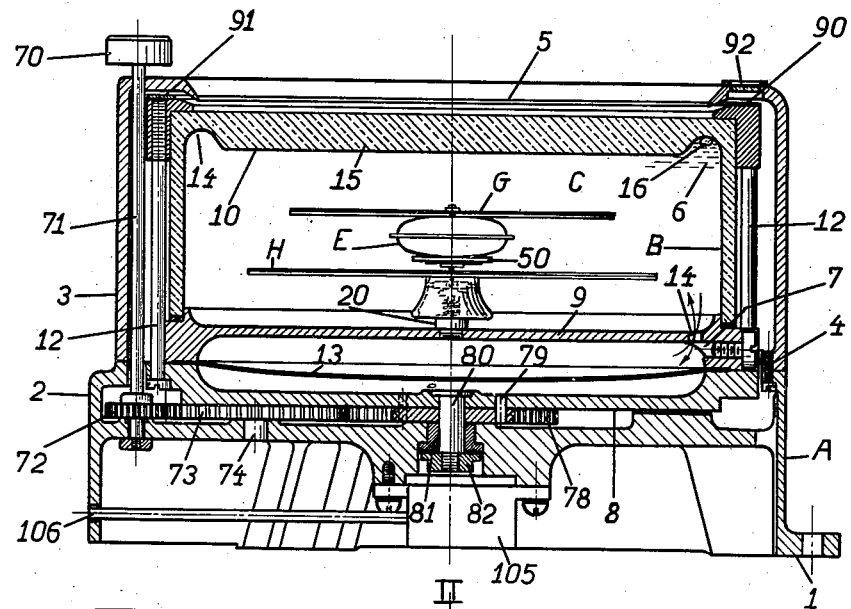
Fig_1
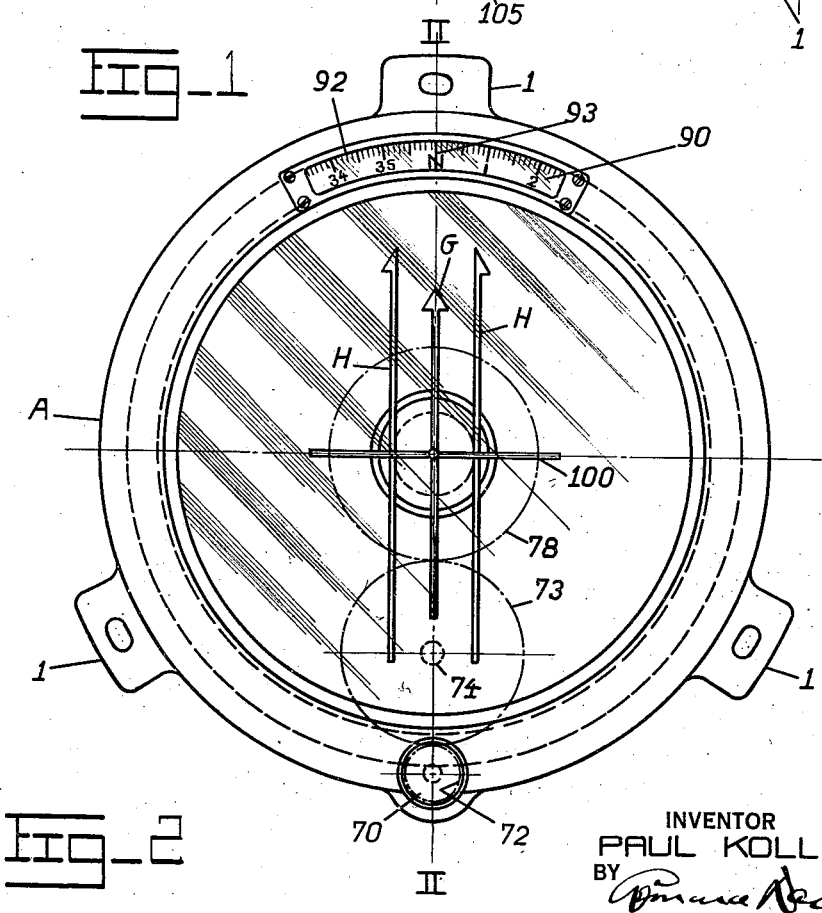
Fig_2
INVENTOR
PAUL KOLLSMAN
BY
ATTORNEY

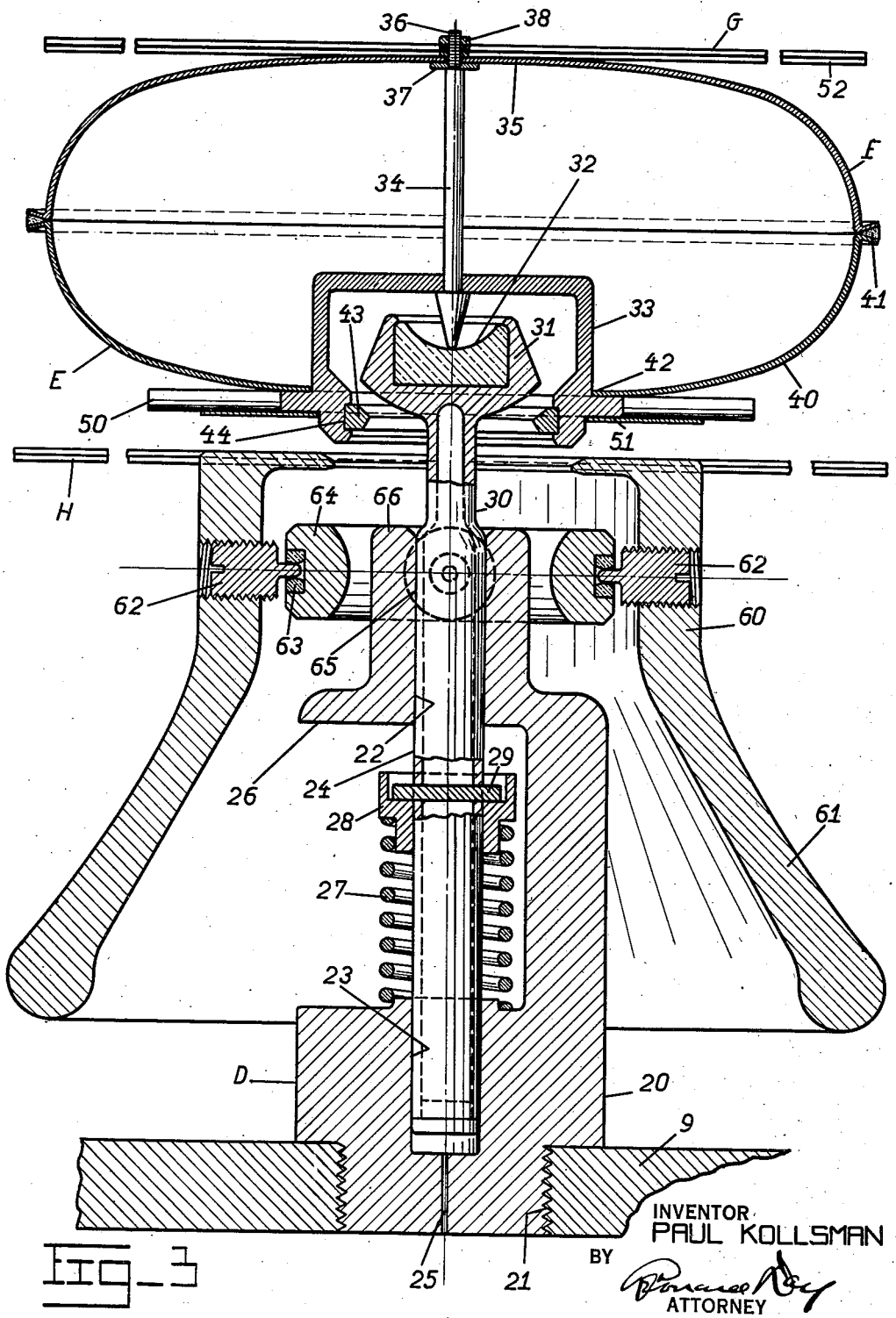

Patented May 28, 1940

2,202,154

UNITED STATES PATENT OFFICE 2,202,154

APERIODIC COMPASS

Paul Kollsman, New York, N. Y., assignor, by mesne assignments, to Square D Company, Detroit, Mich., a corporation of Michigan Application May 25, 1936, Serial No. 81,604

8 Claims. (Cl. 33—223)

This invention relates to indicating devices depending for their indication upon a rotatable pendulously mounted indicating element such as the so-called compass needle or compass card of a magnetic compass or such as the direction finding assemblage of a gyroscopic compass.

An object of the invention is to improve the relative reading between an indicating part of such an indicating element and indicating parts of a suitable reference element. For example, a long arrow may be the indicating part of an indicating element which it is desired by steering of some transport to maintain parallel to a pair of contiguous parallel lines or arrows borne by a settable rotatable reference element. The term "transport" includes any carrier such as an airship, ocean going vessel or land ship the course of which is to be directed by such an instrument.

If the parallel arrows rotatably settable must arbitrarily remain in a plane fixed relatively to the transport, the pendulosity of the direction indicating element causes apparent non-parallelism between the direction arrow and the setting arrows when viewed by a pilot in some directions even though the angular position of the indicating element actually be the same as the angular position of such fixed reference arrows or lines.

In carrying out the object of the invention substantial workable parallelism or at least such within a negligible error is imparted to my combination between the indicating and reference elements.

In carrying out this objective, without impairing the rotatable settability of the reference elements, I provide pendulous mounting for the rotatable reference element. If the rotatable pendulously mounted indicating element is provided with damping, I propose likewise to damp the pendulous motion of the reference element similarly and so that pendulous movement of the two elements will synchronize to maintain substantial parallelism, when the transport is on its course.

This pendulous mounting of my rotatable reference element from one viewpoint is preferable in all planes for the pendulosity but this viewpoint is largely that of theoretical perfection.

From another viewpoint, that of economy and simplicity of manufacture, pendulosity solely in one plane is preferable. This plane should be the plane of the direction indicating arrow and the axis of rotation. By this expedient but negligible error in the reading of the direction element relatively to the indicating element can be present.

A further object of the invention is to improve the entire construction of a compass for use on transports.

The claims are directed to illustrative embodiments of my invention which are described in the following specification in connection with the accompanying drawings only for the purpose of illustration.

Fig. 1 is a vertical section through a structure embodying my invention, taken through the plane of line II—II of Fig. 2;

Fig. 2 is a top plan view of the same; and

Fig. 3 is a fractional vertical section, drawn to an enlarged scale, of the pendulous elements.

An outer casing A is adapted to be fixed as by screw securable feet I to the floor of a transport, on airplanes preferably at the feet of the pilot. This outer casing A conveniently may be a nonmagnetic metal casing and preferably comprises a base part 2 and top shell 3 suitably securable one to the other as by bolts 4. The top of the shell 3 is formed with a sight opening 5 which may be glass covered or open. Within the external casing A is an internal casing B fluid tight to contain a charge 6 of damping fluid which may be introduced through the screw plug closed port 7. This inner casing may be rotatable as an entirety and as shown formed in three parts, a flanged dish-shaped sub base 8, an overlying flanged partition wall 9 and an inverted cup shaped transparent closure 10—all solids of revolution. Screw clamps 12 complete the assemblage of these three parts of the internal casing and serve likewise to clamp a resilient diaphragm 13 between the flanges of the parts 8 and 9. A port 14 permits the passage into and out of the main chamber C for the damping fluid 6 to take care of expansion and contraction. A circular inverted track like groove at the rim of the upper glass wall 15 provides a trap 14 away from visibility for any air bubbles 16.

In the embodiment illustrated, centrally mounted to upstand from the partition 9, is a combination structure D for mounting both the indicating element and the reference element. A post 20 has nipple like threaded engagement in the central perforation 21 and has vertically aligned slip bearings 22 and 23 for the compass supporting post 24. The lower bearing 23 is closed at the bottom except for the vent duct 25 so that it may function as fluid viscous breaking means or dash pot acting against too rapid movement for the post 24. Preferably the post 24 is hollow for flotation effect at least partially to overcome gravity. The cut out 25 permits the easy assemblage of the cushion spring 27, collar 28 and lock pin 29 on the post 24. The upper end of the post 24 is preferably reduced in cross-section to form the throat 30 flaring at the top into the jewel mount 31 carrying the compass jewel 32.

The entire direction finding and direction indicating element or structure E is pendulously pivotally swivelled upon this jewel 32 and comprises a suitable central cylindrical hub 33 of inverted cup shape contour to which the pivot pin 34 is fixedly secured to extend upwardly to terminate beneath the inner face of the upper part 35 of the float shell. The threaded part 36 clamps the indicating parts to the shell part 35 and to the washer 37 overlying the pivot 32 as by means of a nut 38. The float F is completed by a lower shell 40 soldered to the top shell 35 at the joint 41 and is suitably secured as by soldering or brazing at its inner rim 42 to the hub 33. A split ring 43 may be provided in a socket channel 44 of the hub to prevent a separation of the pivot pin 34 and the jewel bearing which ring 43 has an inner diameter less than the diameter of the jewel cup 31, thus preventing an upward movement of the float assembly sufficient to separate the pivot 34 from the jewel 32 by such an amount as to produce an inoperative condition. Suitably secured symmetrically about the vertical axis are the usual bar magnets 50 which are arranged parallel and may be secured to the hub 33 by the bridge 51.

The direction indicating part of element E is shown in the form of a metal arrow G having a reinforcing rib 52. The arrow G is clamped in position as by the nut 38 and is preferably white in color as are arrows H. The rest of the mechanism and parts visible through the sight opening 5 are painted black so that the elements G and H show forth white against a black ground.

The visible part of the settable reference element is preferably in the form of a pair of parallel spaced metallic arrows H also painted white. These reference arrows are suitably fixed to the top part 60 which flares into a symmetrical skirt 61 at the bottom. In its theoretically preferable form gimbal trunnion screws 62 mount this part 60 in jewel bearings 63 of the gimbal ring 64. Similar trunnions and bearings swivel the gimbal ring 64 to the nose 66 of post 20. In the best practical construction the swivelling support of the pendulous structure 60—61 may be limited to the vertical plane through the arrows H. This may be accomplished by screwing home the threaded trunnions 62 to prevent rotation on that axis or by extending the trunnions 62 directly into bearing engagement with the jewel top part 66 at the position of the swivelling trunnions 65.

The float F relieves the weight of the indicating assemblage F on the jewel 32 which nevertheless is itself also relieved against vertical acceleration pressure by being hollow and by the spring 27 and dash pot arrangement 23—25.

Objectively the reference arrows H are to be set from the exterior of the instrument. To this end externally manipulated means for rotating the post 20 are provided. In the embodiment illustrated, the entire internal or sub-casing B which carries the post 20 is adapted to be rotated. This is accomplished by means of the finger knob 70, operating shaft 71 to which is fixed pinion 72. Pinion 72 drives gear 73 journaled by auxiliary shaft 74 in the casting 2. Gear 73 engages and drives gear 78 pinned by pins 79 to the wall 8. Stub shaft 80 centrally pierces the wall 8, and the axis of gear 78 and is rotatable in bearing 81 where it is locked by nut 82 but not against rotation. The stub shaft 80 and pins 79 make a hermetical seal with the wall 8 to prevent leakage of the damping fluid 6. A setting scale 90 is formed on the margin of the rotatable inner casing B and is shown provided on a sheet metal ring 91 and is viewable through the sight window 92, bearing the reference mark or lubber line 93. By means of this scale the desired course setting of the indicating element H may be affected by manipulation of the finger knob 70. The shaping and proportioning of the part 60, 61 mounting and supporting the reference part H and the swivelling axis or axes therefor are chosen so that the tilt of the direction indicator G or compass pointer corresponds to the tilt of the reference element H. The uniform pendulous tilt serves to maintain substantial parallelism between the arrow G and the arrows H whereby parallax or other optical errors are eliminated. In effecting this adjustment the moment of tilt of the compass resulting from gravity and centrifugal force on an airplane is adjusted to be substantially equal for both the reference element assemblage H and the indicating element assemblage E minus the flotation moments of these respective assemblages. That is, during maneuvers by the plane, the tilting which occurs tends to cause movement of the compass magnet members out of a position of parallelism with the cover plate glass 15, and the members H and the support therefor are so proportioned that under the same tilting forces, they tilt by a corresponding amount, thereby maintaining substantial parallelism between the operating planes of the compass pointer and the reference lines, and maintaining a uniform condition of parallax to avoid errors in reading which might occur from a varying parallax. The drawings show a reasonably accurate design for attaining this condition. For instruction in attaining accuracy recourse is to be had to calculus and the design of the various parts as solids of revolution make this calculation relatively simple. I contemplate however, the combination of auxiliary damping means such as cross bar 100 which is fixed to the indicating element E. This functions to reduce the pendulous tilt out of the plane of the arrow G.

Any and all of the usual accompaniments to a compass may be provided. For example, lights for illuminating the compass may be mounted within the outer casing 3. Provision is likewise made for the magnetic adjusting compensator 105 which may be adjusted through the adjusting shaft 106.

What I claim and desire to secure by United States Letters Patent is:

1. A directional instrument comprising, in combination, a support; a direction responsive element mounted thereon for freedom to turn about, and tilt relatively to, a first axis of said support; an elongated pointer carried by said element thereby partaking of all movements of said element; an elongated reference member settable for a predetermined course in azimuth, said member extending alongside said pointer for establishing a reference direction by parallelism, or lack of it, with said pointer, said reference member being mounted on said support for freedom to tilt relatively to said support about an axis substantially normal to and for setting in azimuth about said first axis; and means for setting said reference member relatively to said pointer by rotation about said first axis to indicate a predetermined course.

2. A magnetic compass comprising, in combination, a compass bowl; a magnetic element mounted inside said bowl for freedom to turn about, and tilt relatively to, a first substantially vertical axis; an elongated pointer carried by said magnetic element thereby partaking of all movements of said element; an elongated reference member extending alongside said pointer for establishing a reference direction by parallelism, or lack of it, with said pointer, said reference member being mounted inside said bowl for freedom to tilt relatively to said bowl about an axis substantially normal to said first axis, and means for setting said reference member relatively to said pointer by rotation about said first axis.

3. A magnetic compass comprising, in combination, a base member; a compass bowl mounted on said base member for rotation about a first substantially vertical axis; a magnetic element mounted inside said bowl for freedom to turn about, and tilt relatively to, said first axis; a pointer carried by said magnetic element thereby partaking of all movements of said element; an elongated reference member extending alongside said pointer for establishing a reference direction by parallelism, or lack of it, with said pointer, said reference member being mounted inside said bowl for freedom to tilt relatively to said bowl about an axis substantially normal to said first axis; means for rotating said bowl relatively to said base member, and indicating means associated with said bowl and said base member for indicating the relative position of said bowl with respect to said base member.

4. In a directional instrument a support; a direction responsive elongated pointer pendulously mounted thereon for freedom to turn about, and tilt relatively to, a first substantially vertical axis of said support, the pointer normally assuming a horizontal position; an elongated settable reference member extending alongside said pointer for establishing a reference direction by parallelism, or lack of it, with said pointer, said reference member being pendulously mounted on said support for freedom to tilt relatively to said support about a substantially horizontal axis normal to the reference direction established by said member; and means for setting said reference member relatively to said pointer by rotation about said first axis and indicating means associated with said setting means for indicating the direction in which said reference member is set relatively to the direction established by said pointer.

5. A compass having a bowl; a north indicating needle supported in said bowl; an elongated member located within said bowl and extending alongside said needle in position to cooperate therewith to indicate a predetermined course when said needle is in parallel with said member; and means for adjustably supporting said bowl whereby the position of said member can be set in accordance with a predetermined course.

6. A compass having a bowl; a direction indicating needle mounted within said bowl; parallel rods located within said bowl on opposite sides of said needle to cooperate therewith for indicating a predetermined course when said needle is in parallel with said rods; and means for setting the position of said rods in accordance with the course to be steered.

7. A compass having a bowl; a direction indicating needle located within said bowl; parallel rods supported in said bowl and located on opposite sides of said needle to cooperate therewith for indicating a predetermined course when said needle is in parallel with said rods; an azimuth ring associated with said bowl; and means for adjustably supporting said bowl so that the positions of said rods can be set in accordance with the course to be steered.

8. A compass having an external casing having a sight opening at the top; an internal casing within said external casing forming a fluid tight enclosure and having a sight opening at the top aligned with the sight opening of said external casing; means for rotating said internal casing relatively to said external casing; a pendulously mounted rotatable direction finding element within said internal casing; and a settable reference element pendulously mounted within said internal casing in at least one plane, said element being connected for rotation with said external casing.

PAUL KOLLSMAN.